(12) United States Patent
Ikarashi et al.

(10) Patent No.: US 10,002,547 B2
(45) Date of Patent: Jun. 19, 2018

(54) SECRET CALCULATION METHOD, SECRET CALCULATION SYSTEM, RANDOM PERMUTATION DEVICE, AND PROGRAM

(71) Applicant: NIPPON TELEGRAPH AND TELEPHONE CORPORATION, Chiyoda-ku (JP)

(72) Inventors: Dai Ikarashi, Musashino (JP); Koki Hamada, Musashino (JP); Ryo Kikuchi, Musashino (JP); Koji Chida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 29 days.

(21) Appl. No.: 15/110,886

(22) PCT Filed: Jan. 7, 2015

(86) PCT No.: PCT/JP2015/050231
§ 371 (c)(1),
(2) Date: Jul. 11, 2016

(87) PCT Pub. No.: WO2015/107952
PCT Pub. Date: Jul. 23, 2015

(65) Prior Publication Data
US 2016/0335924 A1 Nov. 17, 2016

(30) Foreign Application Priority Data

Jan. 17, 2014 (JP) .................................. 2014-006694

(51) Int. Cl.
*H04L 29/06* (2006.01)
*G09C 1/00* (2006.01)
(Continued)

(52) U.S. Cl.
CPC ............... *G09C 1/00* (2013.01); *G06F 21/60* (2013.01); *H04L 9/085* (2013.01); *H04L 2209/46* (2013.01)

(58) Field of Classification Search
CPC . H04L 9/085; H04L 2209/46; H04L 2209/04; G06F 21/60; G09C 1/00
(Continued)

(56) References Cited

U.S. PATENT DOCUMENTS 6,035,041 A * 3/2000 Frankel ................... H04L 9/302
380/28
6,772,339 B1 * 8/2004 Jakobsson ............. H04L 9/0841
380/283

(Continued)

OTHER PUBLICATIONS

Beerliová-Trubíniová, Zuzana, and Martin Hirt. "Perfectly-secure MPC with linear communication complexity." Theory of cryptography (2008): 213-230.*
(Continued)

*Primary Examiner* — Syed Zaidi
(74) *Attorney, Agent, or Firm* — Oblon, McClelland, Maier & Neustadt, L.L.P.

(57) ABSTRACT

Secret calculation including secret random permutation is performed at high speed. In unit permutation, random permutation devices $p_0, \ldots, p_{k-1}$ perform permutation of additive secret sharing values $«a»^{\rho i}$ of a plain text a with sub shares $\pi_{\rho i}$ of permutation data $\pi$. In resharing, the random permutation device $p_0$ generates additive secret sharing values $«a»^{\rho i+1}{}_{pk}$ by using random numbers $r_1, \ldots, r_{k-1}$ which are respectively shared with random permutation devices $p_j$ ($j=1, \ldots, k-1$) so as to transmit the additive secret sharing values $«a»^{\rho i+1}{}_{pk}$ to the random permutation device $p_k$ and each of the random permutation devices $p_j$ generates additive secret sharing values $«a»^{\rho i+1}{}_{pj}$ by using random numbers $r_j$.

13 Claims, 10 Drawing Sheets

(51) Int. Cl.
*G06F 21/60* (2013.01)
*H04L 9/08* (2006.01)

(58) Field of Classification Search
USPC .......................................................... 380/28
See application file for complete search history.

(56) References Cited

U.S. PATENT DOCUMENTS

| | | | | |
|---|---|---|---|---|
| 2003/0002662 | A1* | 1/2003 | Nishioka | H04L 9/302 380/30 |
| 2003/0046547 | A1* | 3/2003 | Jakobsson | G06F 7/723 713/180 |
| 2004/0030932 | A1* | 2/2004 | Juels | H04L 63/083 713/151 |
| 2007/0172054 | A1* | 7/2007 | Munro | H04L 9/0656 380/28 |
| 2008/0063192 | A1* | 3/2008 | Goubin | G06F 21/556 380/46 |

OTHER PUBLICATIONS

Dai Ikarashi, et al., "An Improvement of Secure Sorting toward 1 sec. Response on Internet", The 31$^{st}$ Symposium on Cryptography and Information Security, Total 9 Pages, (Jan. 21, 2014) with partial English translation.

Koki Hamada, et al., "A Random Permutation Protocol on Three-Party Secure Function Evaluation", Computer Security Symposium, Total 6 Pages, (2010) with English abstract.

Dai Ikarashi, et al., "O(I) Bits Communication Bit Decomposition and O(Ip'I) Bits Communication Modulus Conversion for small k Secret-sharing-based Secure Computation", Computer Security Symposium, Total 8 Pages, (2013) with English abstract.

Ronald Cramer, et al., "Share Conversion, Pseudorandom Secret-Sharing and Applications to Secure Computation", TCC, vol. 3378 of Lecture Notes in Computer Science, pp. 342-362, (2005).

Dai Ikarashi, et al., "An Extremely Efficient Secret-sharing-based Multi-Party Computation against Malicious Adversary", The 30$^{st}$ Symposium on Cryptography and Information Security, Total 8 Pages, (Jan. 22-25, 2013) with corresponding English version entitled: "Actively Private and Correct MPC Scheme in t < nl2 from Passively Secure Schemes with Small Overhead", Total 18 Pages.

Dai Ikarashi, et al., "Actively Private and Correct MPC Scheme in t < nl2 from Passively Secure Schemes with Small Overhead", IACR Cryptology Eprint Archive, vol. 2014, Total 37 Pages, (2014).

International Search Report dated Feb. 10, 2015 in PCT/JP15/050231 Filed Jan. 7, 2015.

* cited by examiner

NUMBER OF TIMES OF UNIT PERMUTATION

| PARTY | 1 | 2 | 3 |
|---|---|---|---|
| $p_0$ | ○ | ○ | |
| $p_1$ | | | ○ |
| $p_2$ | | | ○ |

FIG. 10

NUMBER OF TIMES OF UNIT PERMUTATION

| PARTY | 1 | 2 | 3 | 4 | 5 | 6 | 7 | 8 | 9 | 10 |
|---|---|---|---|---|---|---|---|---|---|---|
| $p_0$ | ○ | ○ | ○ | ○ | ○ | ○ | | | | |
| $p_1$ | | | | | | | | ○ | ○ | ○ |
| $p_2$ | | | | | | | ○ | | ○ | ○ |
| $p_3$ | | | | | | | ○ | ○ | | ○ |
| $p_4$ | | | | | | | ○ | ○ | ○ | |

FIRST STAGE | SECOND STAGE

FIG. 11

NUMBER OF TIMES OF UNIT PERMUTATION

| PARTY | 1 | 2 | 3 |
|---|---|---|---|
| $p_0$ |  | ○ | ○ |
| $p_1$ | ○ |  |  |
| $p_2$ | ○ |  |  |

FIG. 12

NUMBER OF TIMES OF UNIT PERMUTATION

| PARTY | 1 | 2 | 3 | 4 | 5 | 6 | 7 | 8 | 9 | 10 |
|---|---|---|---|---|---|---|---|---|---|---|
| $p_0$ |  |  |  |  | ○ | ○ | ○ | ○ | ○ | ○ |
| $p_1$ |  | ○ | ○ | ○ |  |  |  |  |  |  |
| $p_2$ | ○ |  | ○ | ○ |  |  |  |  |  |  |
| $p_3$ | ○ | ○ |  | ○ |  |  |  |  |  |  |
| $p_4$ | ○ | ○ | ○ |  |  |  |  |  |  |  |

FIRST STAGE — SECOND STAGE

FIG. 13

SECRET CALCULATION METHOD, SECRET CALCULATION SYSTEM, RANDOM PERMUTATION DEVICE, AND PROGRAM

TECHNICAL FIELD

The present invention relates to a secret calculation technique, and especially relates to a technique for performing secret random permutation.

BACKGROUND ART

Secret calculation is a technique in which data processing is performed while concealing data by secret sharing. The secret sharing is a technique in which data is converted into a plurality of distributed values so that original data can be restored by using a certain number or more number of pieces of distributed values, while original data cannot be restored by using distributed values of which the number of pieces is smaller than the certain number. The secret sharing can be categorized into several kinds. Examples of the secret sharing include (k,n)-secret sharing, additive secret sharing, permutation data secret sharing, and the like.

The (k,n)-secret sharing is secret sharing in which a plain text which is inputted is divided into n pieces of shares so as to be distributed to n pieces of parties $P=(p_0, \ldots, p_{n-1})$ in advance. The plain text can be restored when arbitrary k pieces of shares are provided. Any information on the plain text cannot be obtained from shares of which the number is smaller than k. Specific examples of types of the (k,n)-secret sharing include Shamir secret sharing, replicated secret sharing, and the like.

The additive secret sharing is (k,k)-secret sharing by the replicated secret sharing. The (k,k)-secret sharing represents a case where n=k is set in the (k,n)-secret sharing. In the (k,k)-secret sharing, it is impossible to restore a plain text until shares of all parties are collected. The additive secret sharing is the simplest secret sharing in which a plain text is restored only by adding up k pieces of shares.

The permutation data secret sharing is secret sharing performed while concealing permutation data. The permutation data is data representing the rearrangement way in rearrangement of data columns. When m pieces of data columns are rearranged, permutation data $\pi$ having the volume m is data representing a bijective map $\pi:N_m \to N_m$. Here, $N_m$ represents a collection of non-negative integers which are smaller than an arbitrary integer m. For example, data of which elements in vectors $\vec{x} \in (N_m)^m$ are different from each other can be assumed as random permutation data having the volume m.

More specifically, a vector $\vec{x}=(3,0,2,1)$ can be assumed as random permutation data having the volume 4. For example, it is assumed to rearrange the data column $\vec{y}=(1,5,7,10)$ by the vector $\vec{x}$. 1 which is the 0th element of the data column $\vec{y}$ is moved to the third position represented by the 0th element of the vector $\vec{x}$. 5 which is the first element of the data column $\vec{y}$ is moved to the 0th position represented by the first element of the vector $\vec{x}$. In a similar manner, 7 is moved to the second position and 10 is moved to the first position. As a result, the post-permutation data column $\vec{z}=(5,10,7,1)$ is obtained.

In the permutation data secret sharing, permutation data is concealed by the following procedure. It is assumed that there are N pieces of k party groups of columns $P=\rho_0, \ldots, \rho_{N-1}$. For example, when k=2, each k party group $\rho_i$ is a set $(p_0,p_1)$ of the party $p_0$ and the party $p_1$, a set $(p_0,p_2)$ of the party $p_0$ and the party $p_2$, or the like. It is assumed that all parties in each k party group $\rho_i$ mutually share the permutation data $\pi_{\rho i}$ and the permutation data $\pi_{\rho i}$ is not informed to a complement are $\rho_i$. Further, a corresponding plain text is assumed to be $\pi_0(\pi_1( \ldots (\pi_{N-1}(I)) \ldots ))$. Here, I represents permutation in which output is performed in the same arrangement as that of input, that is, identical permutation. In this case, if the k party groups of columns $P=\rho_0, \ldots, \rho_{N-1}$ is set so that "(condition 1) any complement $\rho_i$ satisfies $\rho \subseteq \rho_i$ with respect to an arbitrary k-1 party group $\rho$", any permutation data $\pi_{\rho i}$ is unknown in any coupling of the k-1 party.

For example, when the number n of parties satisfies n≥2k-1, the above-mentioned condition 1 is satisfied if the column P of the k party groups is set as a collection including all the k party groups. Further, when the number n of parties satisfies n>2k-1, the above-mentioned condition 1 is sometimes satisfied even if not all the k party groups are included. For example, when k=2 and n=4, the condition 1 is satisfied though $\{(p_0,p_1),(p_2,p_3)\}$ does not include all the k party groups.

The secret random permutation is a technique for performing permutation of an inputted data column in a random manner while concealing the permutated orders even from a processing executor. As a conventional technique for performing the secret random permutation, the technique described in Non-patent Literature 1 is disclosed.

As a basic form of the secret random permutation described in Non-patent Literature 1, permutation data secret sharing values $<\pi>$ are generated with the input of the column $[\vec{a}]$ of (k,n)-secret sharing values so as to output the column $[\vec{b}]=([a_{\pi(0)}], \ldots, [a_{\pi(m-1)}])$ of (k,n)-secret sharing values. At this time, it is characterized that any parties do not know the plain text $\pi$ of the permutation data secret sharing values $<\pi>$, that is, the permutated order in the data column. As specific processing, the party $p \in \rho_i$ which belongs to the k party collection $\rho_i$ performs normal permutation processing, which is not a secret calculation, with respect to each sub share $\pi_{\rho i}$ in permutation data secret sharing so as to generate $([a_{\pi \rho i(0)}], \ldots, [a_{\pi \rho i(m-1)}])$ from the input $[\vec{a}]=([a_0], \ldots, [a_{m-1}])$ and performs redoing of the secret sharing of $([a_{\pi \rho i(0)}], \ldots, [a_{\pi \rho i(m-1)}])$ by processing called resharing in a repeated manner.

The following three types of secret random permutation can be conceivable based on the difference in forms of an input and an output. The first type is a case where both of an input and an output are (k,n)-secret sharing values. The second type is a case where an input is a (k,n)-secret sharing value and an output is a disclosed value. The third type is a case where an input is a disclosed value and an output is a (k,n)-secret sharing value. In the case where an input is a disclosed value, the above-described processing of the basic form is performed after the disclosed value is subjected to secret sharing to be secret sharing values. Further, in the case where an output is a disclosed value, disclosed processing is performed after the above-described processing of the basic form is performed. A disclosed value is a value which is known by all parties. The disclosed processing represents that all parties transmit own shares to other all parties and secret sharing is restored from the shares which are received by all parties.

PRIOR ART LITERATURE

Non-Patent Literature

Non-patent Literature 1: Koki Hamada, Dai Ikarashi, Koji Chida, Katsumi Takahashi, "A Random Permutation Protocol on Three-Party Secure Function Evaluation", Computer Security Symposium 2010, 2010

SUMMARY OF THE INVENTION

Problems to be Solved by the Invention

In the secret random permutation described in Non-patent Literature 1, processing of permutation and processing of resharing are repeated by using (k,n)-secret sharing values. Respective parties have to mutually communicate with all other parties so as to perform resharing of (k,n)-secret sharing values. Thus, there is a problem in which the communication volume and the number of communication stages are large.

An object of the present invention is to reduce the communication volume and the number of communication stages required for secret random permutation and to perform secret calculation including secret random permutation at high speed.

Means to Solve the Problems

In order to solve the above-described problem, a secret calculation method according to the present invention, in which n and k are set as integers which are 2 or larger, n>k holds, $N={}_nC_k$ holds, p is set as a group of k pieces of random permutation devices which are selected from n pieces of random permutation devices, $\rho_0, \ldots, \rho_{N-1}$ are set to satisfy $|\rho_i \backslash \rho_{i+1}|=1$ with respect to $i=0, \ldots, N-2$, «a»$^{\rho i}$ is set as additive secret sharing values of a plain text a, the additive secret sharing values being possessed by an i-th random permutation device group $\rho_i$, «a»$^{\rho i}_p$ is set as an additive secret sharing value possessed by a random permutation device p among the additive secret sharing values «a»$^{\rho i}$, $\pi_{\rho i}$ is set as sub shares of permutation data $\pi$, the sub shares corresponding to the i-th random permutation device group $\rho_i$, a random permutation device $p_0$ is set as a random permutation device which is included in the i-th random permutation device group $\rho_i$ and is not included in an i+1-th random permutation device group $\rho_{i+1}$, a random permutation device $p_k$ is set as a random permutation device which is not included in the i-th random permutation device group $\rho_i$ and is included in the i+1-th random permutation device group $\rho_{i+1}$, and random permutation devices $p_j$ (j=1, ..., k-1) are set as k-1 pieces of random permutation devices which are included in both of the i-th random permutation device group $\rho_i$ and the i+1-th random permutation device group $\rho_{i+1}$, includes a unit permutation step in which the random permutation devices $p_0, \ldots, p_{k-1}$ perform permutation of the additive secret sharing values «a»$^{\rho i}$ by the sub shares $\pi_{\rho i}$, and a resharing step in which the random permutation device $p_0$ generates additive secret sharing values «a»$^{\rho i+1}_{pk}$ by using random numbers $r_1, \ldots, r_{k-1}$ which are respectively shared with the random permutation devices $p_1, \ldots, p_{k-1}$ so as to transmit the additive secret sharing values «a»$^{\rho i+1}_{pk}$ to the random permutation device $p_k$ and each of the random permutation devices $p_j$ generates additive secret sharing values «a»$^{\rho i+1}_{pj}$ by using the random numbers $r_j$.

Effects of the Invention

According to the secret calculation technique of the present invention, the communication volume and the number of communication stages in performing of secret random permutation can be reduced. Accordingly, secret calculation including secret random permutation can be executed at high speed.

BRIEF DESCRIPTION OF THE DRAWINGS

FIG. 10 illustrates a specific example of k=2 and n=3 in the second embodiment.

FIG. 11 illustrates a specific example of k=3 and n=5 in the second embodiment.

FIG. 12 illustrates a specific example of k=2 and n=3 in the third embodiment.

FIG. 13 illustrates a specific example of k=3 and n=5 in the third embodiment.

DETAILED DESCRIPTION OF THE EMBODIMENTS

Figure 1:
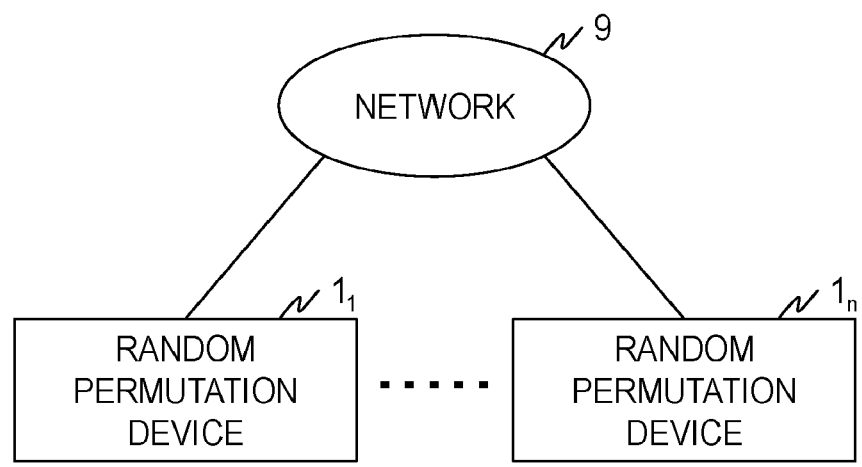
FIG. 1 illustrates the functional configuration of a secret calculation system.

Before provision of the description of embodiments, notation and terms used in this specification are defined.

[Notation]

p represents a party possessing shares.

$P=(p_0, \ldots, p_{n-1})$ represents a collection of the whole of n parties possessing shares.

$\rho=(p_0, \ldots, p_{k-1})$ represents a collection of k party groups executing permutation processing.

$P=(\rho_0, \ldots, \rho_{N-1})$ represents the order in the k party group which executes each permutation processing. Here, $N={}_nC_k$ represents the number of times of execution of the permutation processing and is the number of all combinations in selection of the k party from the n party.

[x] represents a (k,n)-secret sharing value of the plane text $x \in G$. Here, G represents a commutative group. The (k,n)-secret sharing value represents a set obtained by collecting all shares which are obtained by distributing the plain text x by the (k,n)-secret sharing. Secret sharing values [x] are normally possessed in a manner to be distributed in n party collection P, so that all secret sharing values [x] are not possessed at one place and therefore, secret sharing values [x] are virtual.

$[x]_p$ represents a share possessed by the party $p \in P$ among (k,n)-secret sharing values [x].

$[\vec{x}]$ represents a column of (k,n)-secret sharing values by which a column of a plain text becomes $\vec{x}$.

[G] represents a collection of the whole of (k,n)-secret sharing values in the commutative group G.

«x»$^\rho$ represents an additive secret sharing value of the plain text $x \in G$ and represents that the k party group p possesses a share. The additive secret sharing value represents a set obtained by collecting all shares which are obtained by distributing the plain text x by additive secret sharing.

«x»$^ρ_p$ represents a share possessed by the party p∈ρ in the additive secret sharing value «x»$^ρ$.

«$\vec{x}$»$^ρ$ represents a column of additive secret sharing values by which a column of a plain text becomes $\vec{x}$.

«G»$^ρ$ represents a collection of the whole of additive secret sharing values in the commutative group G.

<π> represents a permutation data secret sharing value of permutation data π.

Π represents a collection of the whole permutation data having the volume m.

<Π> represents a collection of the whole permutation data secret sharing value having the volume m.

Points of Invention

The general outline of the secret random permutation according to the present invention is as follows.
Step 1. An input is converted from a (k,n)-secret sharing value or a disclosed value into an additive secret sharing value.
Step 2. Each party which belongs to the k party collection p having shares repeats normal permutation of the permutation data secret sharing value <π> by the sub share $π_ρ$ and resharing on additive secret sharing values. However, the resharing is not performed on the final time. Hereinafter, one time in the repetition is referred to as unit permutation and the whole repeated processing is referred to as repetition permutation.
Step 3. An output is converted from an additive secret sharing value into a (k,n)-secret sharing value or a disclosed value.

An existing method is applicable to Step 1 and Step 3. Points in the processing of Step 2 will be described below.
<Unit Permutation>

A point in the unit permutation is selecting of the k party collection $ρ_i$ on the i-th unit permutation so as to satisfy $|ρ_i \backslash ρ_{i+1}|=1$. That is, only one party is different between the k party collection $ρ_i$ performing the i-th unit permutation and the k party collection $ρ_{i+1}$ performing the i+1-th unit permutation and the rest of k−1 parties are same parties. Such unit permutation is referred to as 1-additive resharing protocol because this unit permutation is the case where only one party is different.

In resharing in the secret random permutation described in Non-patent Literature 1, the communication volume of (n−1)(k−1) pieces of G elements is required. On the other hand, in the 1-additive resharing protocol, the communication volume of only k−1 pieces of G elements is required. Especially, if a seed is preliminarily shared to share a pseudo random number, the communication volume is the communication volume of only one piece of G element. In this case, the communication volume becomes a constant and thus, it is very efficient.

In the 1-additive resharing protocol, data processing is performed in accordance with the following procedure with an input of the secret sharing values «a»$^ρ$∈«G»$^ρ$ which are possessed by the k party group $ρ=p_0,\ldots,p_{k-1}$ so as to output the secret sharing values «a»$^{ρ'}$∈«G»$^{ρ'}$ which are possessed by other k party groups $ρ'=p_1,\ldots,p_k$. Here, it should be noted that roles of the parties are appropriately changed.

First, the party $p_0$ shares the random number $r_i$∈G with the party $p_i$ with respect to i=1, . . . , k−1. Then, the party $p_0$ calculates the secret sharing value «a»$^{ρ'}_{pk}$ with the following formula so as to send the secret sharing value «a»$^{ρ'}_{pk}$ to the party $p_k$. The party $p_k$ outputs the received «a»$^{ρ'}_{pk}$.

$$\langle\langle a \rangle\rangle^{ρ'}_{p_k} = \langle\langle a \rangle\rangle^{ρ}_{p_0} - \sum_{1 \leq i < k} r_i$$

Subsequently, the party $p_i$ (i=1, . . . , k−1) calculates the secret sharing value «a»$^{ρ'}_{pi}$ with the following formula so as to output the secret sharing value «a»$^{ρ'}_{pi}$.

$$\langle\langle a \rangle\rangle^{ρ'}_{p_i} = \langle\langle a \rangle\rangle^{ρ}_{p_i} + r_i$$

<Parallelization of Unit Permutation in Repetition Permutation>

The repetition permutation is repetition of permutation→resharing→permutation→resharing→ . . . → permutation, in which permutation is executed N times and resharing is executed N−1 times. When this is simply described, the number of communication stages is the number of times of resharing, that is, N−1 stages. However, unit permutation by the 1-additive resharing protocol can be parallelized on communication. This is because a party which waits for data reception is one party, that is, only a party which does not participate in the previous unit permutation and other parties execute only offline processing without waiting for any data reception and can shift to the next unit permutation processing. The number of shares of the additive secret sharing is k pieces. Therefore, if the order P in the k party group is appropriately set, k times of unit permutation, at the maximum, can be executed on one stage. Accordingly, the number of communication stages can be reduced to (N−1)/k stages.

The number of communication stages can be efficiently improved by setting the order P in the k party group such that the numbers of communication stages of paths from the party $p_i$ are equal to each other or such that the difference between the maximum value and the minimum value is the smallest, with respect to arbitrary i<k.

The path from the party $p_i$ is the column $(p_{j0},p_{j1},\ldots,p_{jL-1})$ of parties with respect to the column $P=(ρ_0,\ldots,ρ_{L-1})$ of the k party group having the length L, that is, a column which is recursively defined by the following formulas.

$$p_{j_0} = p_i,$$
$$p_{j_{L+1}} = \begin{cases} p_{j_L} & \text{if } p_{j_L} \in P_{L+1} \\ \text{only element } p \text{ of } P_{L+1} \backslash P_L & \text{otherwise} \end{cases}$$

The number of communication stages of a path is the number of λ in which communication is required due to change of parties on the path, that is, $|\{λ \in N_L | p_{jλ} \neq p_{jλ+1}\}|$. The communication in the 1-additive resharing protocol is communication of random numbers except that the party $p_k$ waits for transmission from the party $p_0$ and does not depend on a result of resharing on the previous stage. The number of communication stages of a path represents the number of stages which are aligned in series and therefore, cannot be executed in parallel in communication from the party $p_0$ to the party $p_k$. The number of communication stages in the whole repetition permutation is as expressed in the following formula. Thus, when the numbers of communication stages of respective paths are equal to each other, it is efficient.

$$\max_{i<k} (\text{number of communication stages of path from } p_i)$$

and $$\sum_{i<k} (\text{number of communication stages of path from } p_i) = |P|$$

Embodiments of the present invention will be described in detail below. Here, it should be noted that constituent portions mutually having the same functions are given the same reference numerals in the drawings and duplicate description thereof is omitted.

First Embodiment

Referring to FIG. 1, a configuration example of a secret calculation system according to a first embodiment is described. The secret calculation system includes n (≥2) pieces of random permutation devices $1_1, \ldots, 1_n$ and a network 9. Each of the random permutation devices $1_1, \ldots, 1_n$ is connected to the network 9. It is sufficient that the network 9 is configured so that the random permutation devices $1_1, \ldots, 1_n$ can communicate with each other and the network 9 may be composed of an internet, a LAN, a WAN, or the like, for example. Further, the random permutation devices $1_1, \ldots, 1_n$ do not necessarily have to be able to mutually communicate online via the network 9. For example, such configuration may be employed that information outputted from a certain random permutation device $1_i$ (1≤i≤n) is stored in a portable recording medium such as a USB memory and is inputted offline into another random permutation device $1_j$ (1≤j≤n, i≠j) from the portable recording medium.

Figure 2:
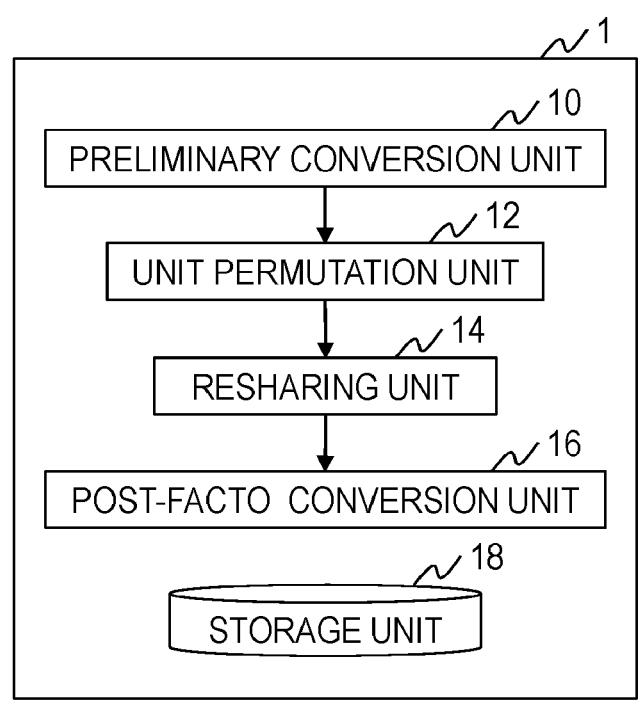
FIG. 2 illustrates the functional configuration of a random permutation device according to a first embodiment.

A configuration example of the random permutation device 1 included in the secret calculation system is described with reference to FIG. 2. The random permutation device 1 includes a preliminary conversion unit 10, a unit permutation unit 12, a resharing unit 14, a post-facto conversion unit 16, and a storage unit 18. The random permutation device 1 is a special device which is configured by reading a special program into a known or dedicated computer including a central processing unit (CPU), a main storage device (a random access memory, RAM), and the like, for example. The random permutation device 1 executes each processing under the control of the central processing unit, for example. Data inputted into the random permutation device 1 and data obtained in each processing are stored in the main storage device, for example, and the data stored in the main storage device is read when needed so as to be used for other processing. The storage unit 18 provided to the random permutation device 1 can be composed of a main storage device such as a random access memory (RAM), an auxiliary storage device composed of a hard disc, an optical disc, or a semiconductor memory element such as a flash memory, or middleware such as a relational database and a key-value store, for example.

In the storage unit 18 provided to the random permutation device $1_p$ corresponding to the party p, the (k,n)-secret sharing value $[a]_p$ or the disclosed value a of the plain text a, the sub share $\pi_p$ of the permutation data $\pi$ corresponding to the k party group $\rho$ including the party p, and N×k pieces of seeds $s_{0,1}, \ldots, s_{N-1,k}$ are stored. Here, the seeds $s_{0,1}, \ldots, s_{N-1,k}$ are preliminarily stored so as to generate random numbers without communication in the later-described processing by the resharing unit 14. However, the seeds $s_{0,1}, \ldots, s_{N-1,k}$ do not have to be stored in the case where random numbers are generated in a coordinated manner each time.

Figure 3:
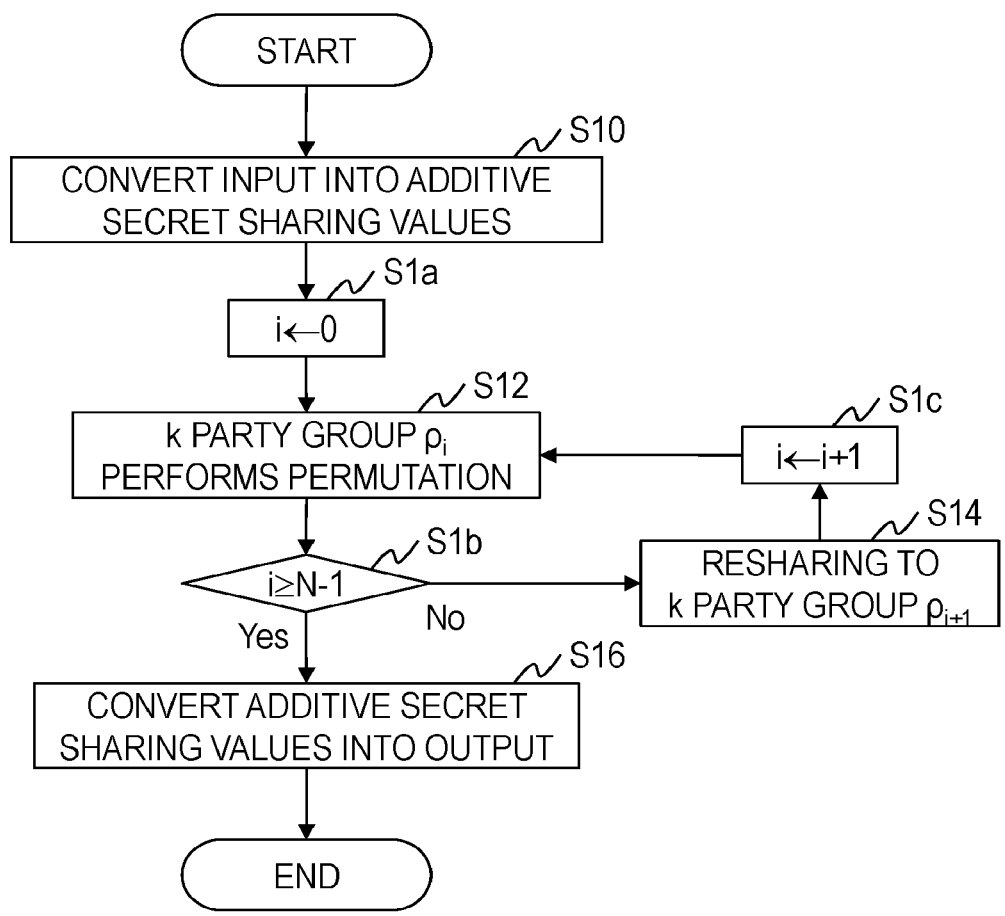
FIG. 3 illustrates a processing flow of a secret calculation method according to the first embodiment.

Referring to FIG. 3, one example of a processing flow of a secret calculation method which is executed by the secret calculation system according to the first embodiment is described in accordance with an order of a procedure which is actually performed.

In step S10, the preliminary conversion units 10 provided to the k pieces of random permutation devices $1_{\rho_0}$ convert the (k,n)-secret sharing values $[a]_{p_i}$ or the disclosed values a which are stored in the storage units 18 into the additive secret sharing values $\langle\langle a \rangle\rangle^{\rho_0}$. $\rho_0$ represents the 0-th element in the column $P = (\rho_0, \ldots, \rho_{N-1})$ of the k party group and the random permutation devices $1_{\rho_0}$ are k pieces of random permutation devices $1_{p_0}, \ldots, 1_{p_{k-1}}$ corresponding to $\rho_0 = (p_0, \ldots, p_{k-1})$.

A known method can be used for the method for converting from a (k,n)-secret sharing value or a disclosed value into an additive secret sharing value.

In the case where an input is a disclosed value, the conversion into an additive secret sharing value can be performed as follows, for example. It is assumed that $\rho$ is a group of the k pieces of random permutation devices $1_{p_0}, \ldots, 1_{p_{k-1}}$, a∈G is a disclosed value which is inputted, and the random permutation device $1_{p_0}$ knows the disclosed value a. The conversion from the disclosed value a into the additive secret sharing value $\langle\langle a \rangle\rangle^\rho$ may be performed with the following formula with respect to i=0, ..., k−1.

$$\langle\langle a \rangle\rangle^P_{p_i} := \begin{cases} a & \text{if } i = 0 \\ 0 & \text{otherwise} \end{cases}$$

In the case where an input is a (k,n)-secret sharing value, the conversion into an additive secret sharing value can be performed by the method described in Reference Literature 1 and Reference Literature 2 below, for example. In Reference Literature 1, the method for converting from linear secret sharing including Shamir secret sharing into additive secret sharing without communication is described. In Reference Literature 2, the method for converting from replicated secret sharing into linear secret sharing without communication is described. Therefore, the conversion from replicated secret sharing into additive secret sharing is realized without communication by combining the method described in Reference Literature 2 and the method described in Reference Literature 1.

[Reference Literature 1] Dai Ikarashi, Koki Hamada, Ryo Kikuchi, Koji Chida, "O(1) Bits Communication Bit Decomposition and O(|p'|) Bits Communication Modulus Conversion for Small k Secret-Sharing-Based Secure Computation", Computer Security Symposium 2013, 2013

[Reference Literature 2] R. Cramer, I. Damgard, and Y. Ishai, "Share conversion, pseudorandom secret-sharing and applications to secure computation", TCC 2005, Vol. 3378 of Lecture Notes in Computer Science, pp. 342-362, 2005

In step S1a, the k pieces of random permutation devices $1_{\rho_0}$ initialize the counter i which shows the number of times of execution of permutation processing to 0.

In step S12, the unit permutation unit 12 provided to the k pieces of random permutation devices $1_{\rho_i}$ permutates the additive secret sharing values $\langle\langle a \rangle\rangle^{\rho_i}$ by using the sub share $\pi_{\rho_i}$ of permutation data which is stored in the storage unit 18. $\rho_i$ represents the i-th element of the column $P = (\rho_0, \ldots, \rho_{N-1})$ of k party group and the random permutation devices $1_{\rho i}$ are k pieces of random permutation devices $1_{p0}, \ldots, 1_{pk-1}$ corresponding to $\rho_i=(p_0, \ldots, p_{k-1})$. A conventional method of permutation data secret sharing may be employed as the method of permutation.

In step S1b, the k pieces of random permutation devices $1_{\rho i}$ determine whether or not permutation processing is executed predetermined times. Specifically, whether or not a value of the counter i reaches N−1 when $N={}_nC_k$ is set as the total number of times of execution of the unit permutation. In the case of i<N−1, the processing goes to step S14. In the case of i≥N−1, the processing goes to step S16.

In step S14, the resharing units 14 provided to the k pieces of random permutation devices $1_{\rho i+1}$ performs resharing of the additive secret sharing values «a»$^{\rho i}$ by the 1-additive resharing protocol. Hereinafter, it is assumed that the random permutation device $1_{p0}$ is a random permutation device which is included in the random permutation devices $1_{\rho i}$ but is not included in the random permutation devices $1_{\rho i+1}$ and the random permutation device $1_{pk}$ is a random permutation device which is not included in the random permutation devices $1_{\rho i}$ but is included in the random permutation devices $1_{\rho i+1}$. Further, it is assumed that the random permutation device $1_{pj}$ (j=1, ..., k−1) represents k−1 pieces of random permutation devices which are included in the random permutation devices $1_{\rho i+1}$ except for the random permutation device $1_{pk}$.

The resharing units 14 provided to the random permutation devices $1_{\rho i+1}$ generate k pieces of random numbers $r_1, \ldots, r_k \in G$. As for the random numbers $r_1, \ldots, r_k$, the k pieces of random permutation devices $1_{\rho i+1}$ may cooperate with each other to generate common random numbers $r_1, \ldots, r_k$ or may generate pseudo random numbers $r_1, \ldots, r_k$ by using the seeds $s_{i,1}, \ldots, s_{i,k}$ which are stored in the storage units 18. In the case where pseudo random numbers are generated by using the seeds $s_{i,1}, \ldots, s_{i,k}$ which are shared in advance, random numbers can be generated without communication among the random permutation devices. Thus, it is very efficient.

Then, the resharing unit 14 provided to the random permutation device $1_{p0}$ generates the additive secret sharing values «a»$^{\rho i+1}_{pk}$ for the random permutation device $1_{pk}$ by using the additive secret sharing values «a»$^{\rho i}_{p0}$ and the random numbers $r_0, \ldots, r_{k-1}$ with the formula below so as to transmit the additive secret sharing values «a»$^{\rho i+1}_{pk}$ to the random permutation device $1_{pk}$.

$$\langle\langle a \rangle\rangle^{\rho_{i+1}}_{P_k} = \langle\langle a \rangle\rangle^{\rho_i}_{P_0} - \sum_{1 \leq i < k} r_i$$

Subsequently, the resharing units 14 provided to the random permutation devices $1_{pj}$ generate the additive secret sharing values «a»$^{\rho i+1}_{pj}$ by using the additive secret sharing values «a»$^{\rho i}_{pj}$ and the random numbers $r_j$ with the formula below.

$$\langle\langle a \rangle\rangle^{\rho_{i+1}}_{P_j} = \langle\langle a \rangle\rangle^{\rho_i}_{P_j} - r_j$$

In step S1c, the k pieces of random permutation devices $1_{\rho i+1}$ add 1 to the counter i showing the number of times of execution of the permutation processing. After that, the unit permutation of step S12 and the resharing of step S14 are repeated until it is determined that the counter i reaches N−1 in step S1b.

In step S16, the post-facto conversion units 16 provided to the k pieces of random permutation devices $1_{\rho N-1}$ convert additive secret sharing values into (k,n)-secret sharing values or disclosed values. The method for converting from an additive secret sharing value into other format can be performed with relatively light volume. Here, it should be noted that the conversion method described below is an example and it does not represent that other conversion methods are not applicable.

There is such method that in the case where an output is a disclosed value, the k pieces of random permutation devices $1_{\rho N-1}$ which execute the permutation processing last transmit the additive secret sharing value «a»$^{\rho N-1}_{pj}$ (j=0, ..., k−1) with respect to the random permutation device $1_p$ (1≤p≤n) which desires to obtain the output and the random permutation device $1_p$ performs restoration. Alternatively, there is such method that the k pieces of random permutation devices $1_{\rho N-1}$ which execute the permutation processing last transmit the additive secret sharing values «a»$^{\rho N-1}_{pj}$ (j=0, ..., k−1) with respect to one piece of random permutation device $1_p$ (p∈ρ) which is selected from a plurality of pieces of random permutation devices $1_\rho$ (ρ⊆{1, ..., n}) which desire to obtain the output and the random permutation device $1_p$ performs restoration to transmit a restoration result to other random permutation devices $1_\rho$.

In the case where an output is a (k,n)-secret sharing value, conversion can be performed by the following procedure, for example, with respect to secret sharing with the additive homomorphism property such as linear secret sharing and replicated secret sharing, that is, secret sharing in which addition can be performed without communication on secret sharing values. The k pieces of random permutation devices $1_{\rho N-1}$ first perform secret sharing of the additive secret sharing values «a»$^{\rho N-1}_{pj}$ by (k,n)-secret sharing of a conversion destination so as to distribute the (k,n)-secret sharing values [«a»$^{\rho N-1}_{pj}]_p$ (p=1, ..., n) to n pieces of random permutation devices $1_P$. Then, the n pieces of random permutation devices $1_P$ add up all of k pieces of (k,n)-secret sharing values [«a»$^{\rho N-1}_{pj}]_p$ which are received.

Thus, the secret calculation system according to the first embodiment converts an input into additive secret sharing values so as to be able to reduce the communication volume in processing of resharing and thus, the processing can be performed more efficiently than conventional random permutation.

Second Embodiment

In the case where an input in secret random permutation is a disclosed value, efficiency can be further improved than the first embodiment. In order to conceal permutation data in random permutation by the method of Non-patent Literature 1 or the first embodiment, unit permutation needs to be performed equal times to the number of elements of the column P of the k party group, of which any complement $\rho_i$ satisfies $\rho \subseteq \rho_i$, with respect to arbitrary k−1 party group ρ. However, in the case where an input is a disclosed value possessed by a certain party p, unit permutation may be performed fewer times. This is because an input is a disclosed value and therefore the party p can perform permutation by one party at first and thus can collectively perform permutation for all disclosed values which are known by the party p.

In the storage unit 18 provided to at least one piece of random permutation device $1_{p0}$, the disclosed value a is stored. The disclosed value a may be possessed at least one device and may be possessed by any number of pieces of random permutation devices.

It is assumed that the sub share $\pi_{\rho i}$, which corresponds to the k party group $\rho_i$ including the party $p_i$, of the permutation data $\pi$ and N×k pieces of seeds $s_{0,1}, \ldots, s_{N-1,k}$ are stored in the storage units 18 provided to n−1 pieces of random permutation devices $\mathbf{1}_{p1}, \ldots, \mathbf{1}_{pn-1}$ except for the random permutation device $\mathbf{1}_{p0}$. Here, N is $_{n-1}C_k$. In a similar manner to the first embodiment, the seeds $s_{0,1}, \ldots, s_{N-1,k}$ do not necessarily have to be stored.

Figure 4:
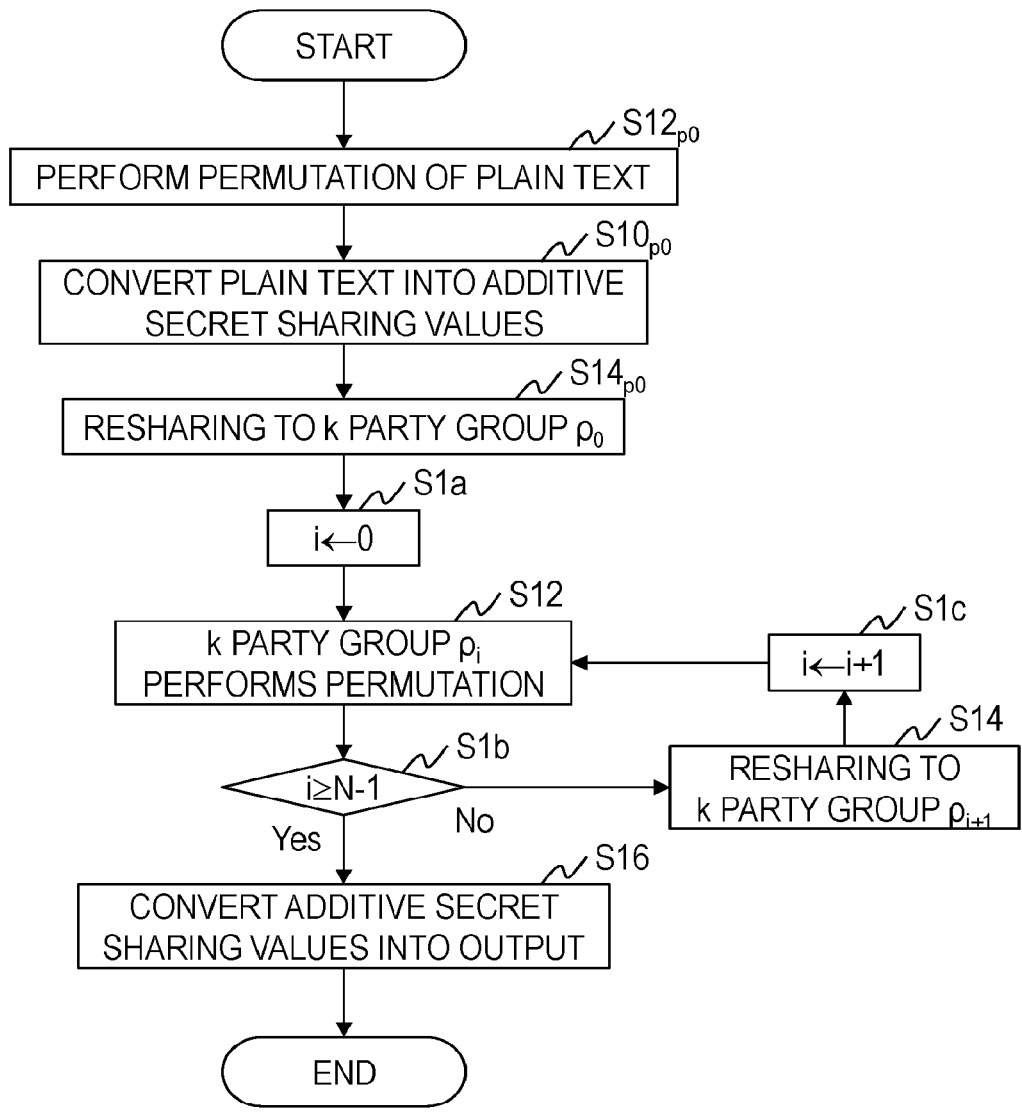
FIG. 4 illustrates a processing flow of a secret calculation method according to a second embodiment.

Referring to FIG. 4, one example of a processing flow of a secret calculation method which is executed by a secret calculation system according to the second embodiment is described in accordance with an order of a procedure which is actually performed.

In step S12$_{p0}$, the unit permutation unit 12 provided to the random permutation device $\mathbf{1}_{p0}$ generates the permutation data $\pi$ which is random so as to permutate the disclosed values a with the permutation data $\pi$. The method of permutation is similar to a conventional permutation method.

In step S10$_{p0}$, the preliminary conversion unit 10 provided to the random permutation device $\mathbf{1}_{p0}$ converts the disclosed values a which are permutated into the additive secret sharing values $\langle\!\langle a \rangle\!\rangle^{p-1}$. The method of conversion is similar to step S10 of the first embodiment. The additive secret sharing values $\langle\!\langle a \rangle\!\rangle^{p-1}$ are distributed to arbitrarily-selected k−1 pieces of random permutation devices among the random permutation devices $\mathbf{1}_{p0}$. It is assumed that distribution is performed with respect to the random permutation devices $\mathbf{1}_{p1}, \ldots, \mathbf{1}_{pk-1}$, in this example.

In step S14$_{p0}$, the resharing units 14 provided to the k pieces of random permutation devices $\mathbf{1}_{p0}$ perform resharing of the additive secret sharing values $\langle\!\langle a \rangle\!\rangle^{p-1}$ by the 1-additive resharing protocol. The method of resharing is similar to that in step S14 of the first embodiment.

After that, processing from step S1$a$ to S16 is executed by n−1 pieces of random permutation devices $\mathbf{1}_{p1}, \ldots, \mathbf{1}_{pn-1}$ except for the random permutation device $\mathbf{1}_{p0}$.

Thus, in the secret calculation system of the second embodiment, random permutation is performed by n−1 pieces of random permutation devices after permutation is collectively performed by one piece of random permutation device, so that the number of times of permutation processing is $_{n-1}C_k+1$. Thus, the secret calculation system of the second embodiment can perform the processing more efficiently than the secret calculation system of the first embodiment.

Third Embodiment

In the case where an output in secret random permutation is a disclosed value as well, efficiency can be further improved than the first embodiment in a similar manner to the case where an input in secret random permutation is a disclosed value. This is because an output is a disclosed value, so that n−1 parties perform random permutation and then secret sharing values are transmitted to one party which is the rest of parties so as to be able to perform permutation collectively with respect to restored disclosed values.

It is assumed that the sub share $\pi_{\rho i}$, which corresponds to the k party group $\rho_i$ including the party $p_i$, of the permutation data $\pi$ and N×k pieces of seeds $s_{0,1}, \ldots, s_{N-1,k}$ are stored in the storage units 18 provided to n−1 pieces of random permutation devices $\mathbf{1}_{p1}, \ldots, \mathbf{1}_{pn-1}$ except for the random permutation device $\mathbf{1}_{p0}$. Here, N is $_{n-1}C_k$. In a similar manner to the first embodiment, the seeds $s_{0,1}, \ldots, s_{N-1,k}$ do not necessarily have to be stored.

Figure 5:
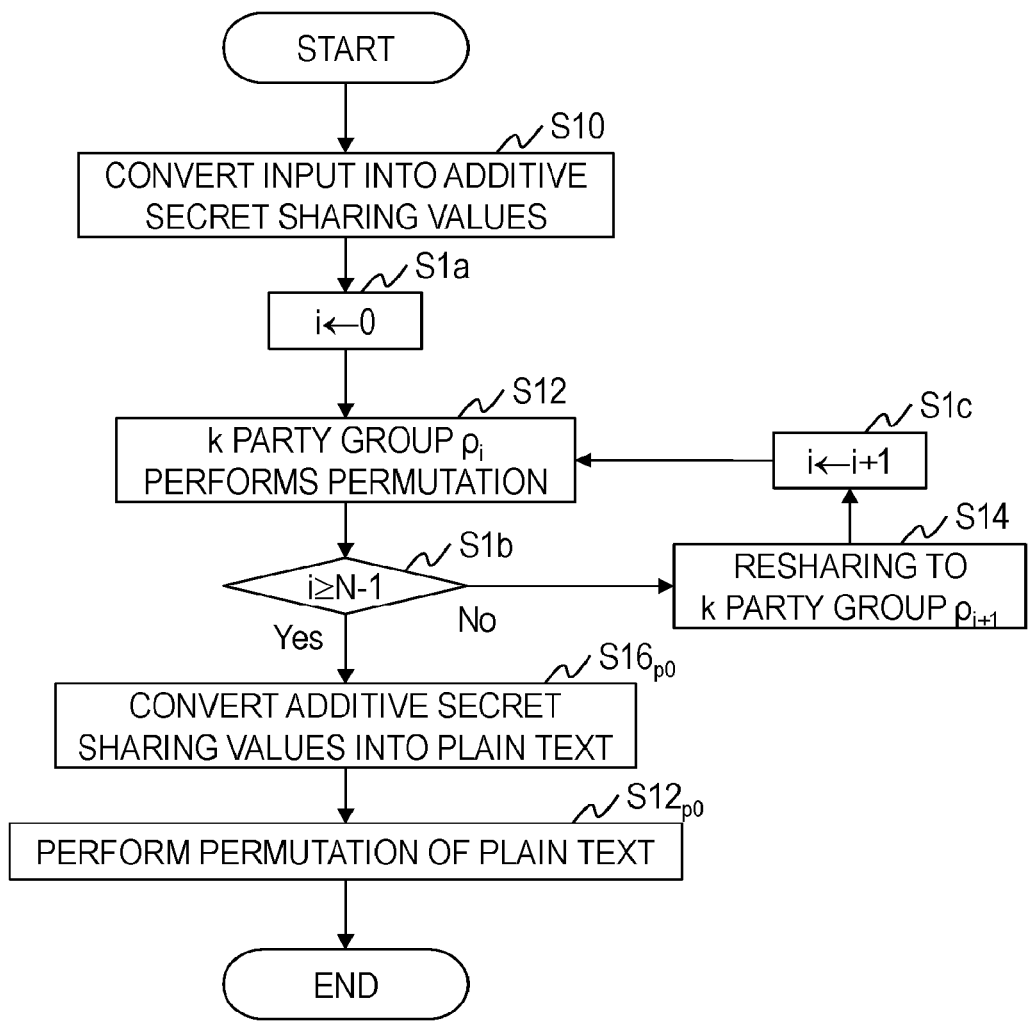
FIG. 5 illustrates a processing flow of a secret calculation method according to a third embodiment.

Referring to FIG. 5, one example of a processing flow of a secret calculation method which is executed by a secret calculation system according to the third embodiment is described in accordance with an order of a procedure which is actually performed.

From step S10 to S1$b$, processing until it is determined that i≥N−1 is satisfied is executed by the n−1 pieces of random permutation devices $\mathbf{1}_{p1}, \ldots, \mathbf{1}_{pn-1}$ except for the random permutation device 40.

In step S16$_{p0}$, the post-facto conversion unit 16 provided to the random permutation device $\mathbf{1}_{p0}$ converts additive secret sharing values into disclosed values. The method of conversion is similar to step S16 of the first embodiment. Specifically, the k pieces of random permutation devices $\mathbf{1}_{\rho N-1}$ which execute the permutation processing last transmit the additive secret sharing values $\langle\!\langle a \rangle\!\rangle^{\rho N-1}_{pj}$ (j=0, …, k−1) with respect to the random permutation device $\mathbf{1}_{p0}$ and the post-facto conversion unit 16 provided to the random permutation device $\mathbf{1}_{p0}$ restores the additive secret sharing values $\langle\!\langle a \rangle\!\rangle^{\rho N-1}$.

In step S12$_{p0}$, the unit permutation unit 12 provided to the random permutation device $\mathbf{1}_{p0}$ generates the permutation data $\pi$ which is random so as to permutate the disclosed values which are restored. The method of permutation is similar to a conventional permutation method.

Thus, in the secret calculation system of the third embodiment, permutation is collectively performed by one piece of random permutation device after random permutation is performed by n−1 pieces of random permutation devices, so that the number of times of permutation processing is $_{n-1}C_k+1$. Thus, the secret calculation system of the third embodiment can perform the processing more efficiently than the secret calculation system of the first embodiment.

Fourth Embodiment

A fourth embodiment enables detection of tampering in secret calculation with respect to secret random permutation of this invention. As a secret tampering detection method for detecting tampering in secret calculation, a method described in Reference Literature 3 below is proposed. In Reference Literature 3, tampering detection in secret calculation is performed in three phases. In a randomization phase, a distributed value is converted into a randomized distributed value of which correctness can be verified. In a calculation phase, desired secret calculation is executed by using an operation, which is composed of the semi-honest operation, for a randomized distributed value. At this time, the calculation is performed while collecting randomized distributed values which will be required for calculation of a checksum in the following correctness verification phase. In the correctness verification phase, checksums are collectively calculated with respect to the randomized distributed values which are collected in the calculation phase so as to perform correctness verification. When the checksum is correct, a calculation result obtained in the calculation phase is outputted. When the checksum is incorrect, only the fact of incorrectness is outputted without outputting the calculation result.

[Reference Literature 3] Dai Ikarashi, Koji Chida, Koki Hamada, Ryo Kikuchi, "An Extremely Efficient Secret-sharing-based Multi-Party Computation against Malicious Adversary", SCIS 2013, 2013

However, in order to apply the method described in Reference Literature 3, each operation executed in secret calculation needs to be tamper-simulatable (Reference Literature 4).

[Reference Literature 4] D. Ikarashi, R. Kikuchi, K. Hamada, and K. Chida, "Actively Private and Correct MPC Scheme in t<n/2 from Passively Secure Schemes with Small Overhead", IACR Cryptology ePrint Archive, vol. 2014, p. 304, 2014

Therefore, in the fourth embodiment, such configuration example is described that the secret tampering detection method described in Reference Literature 3 is applied to secret random permutation of the first embodiment so that the above-mentioned condition is satisfied. Here, an example in which the method is applied to the first embodiment is described below, but the method is applicable to the second embodiment and the third embodiment as well based on a similar concept.

Figure 6:
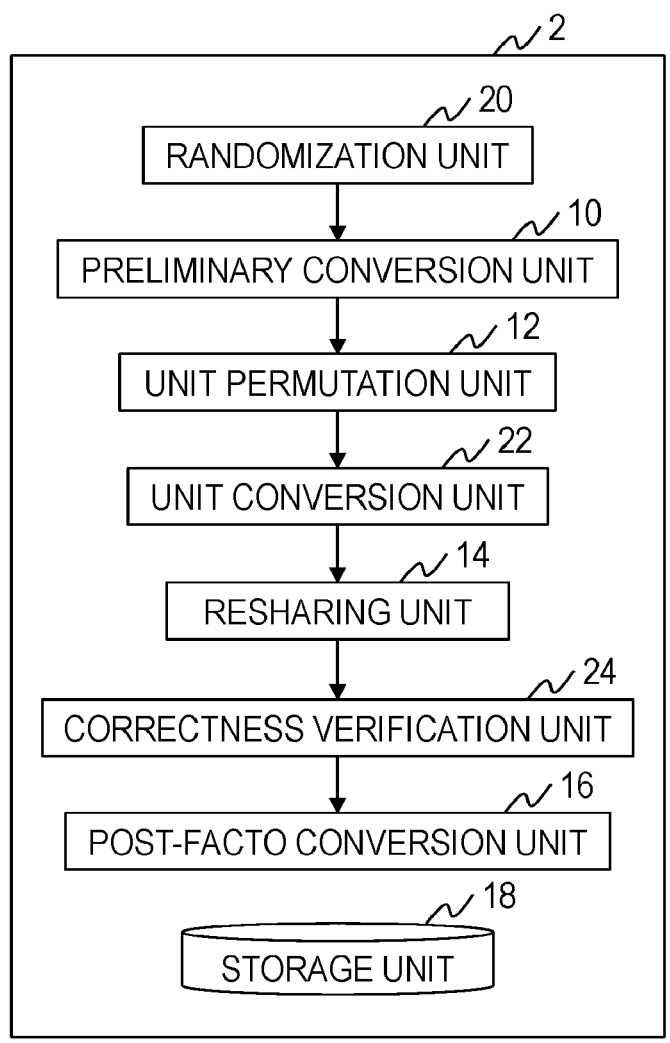
FIG. 6 illustrates the functional configuration of a random permutation device according to a fourth embodiment.

A configuration example of a random permutation device 2 according to the fourth embodiment is described with reference to FIG. 6. The random permutation device 2 includes the preliminary conversion unit 10, the unit permutation unit 12, the resharing unit 14, the post-facto conversion unit 16, and the storage unit 18 in a similar manner to the random permutation device 1 according to the above-described embodiments and further includes a randomization unit 20, a unit conversion unit 22, and a correctness verification unit 24.

Figure 7:
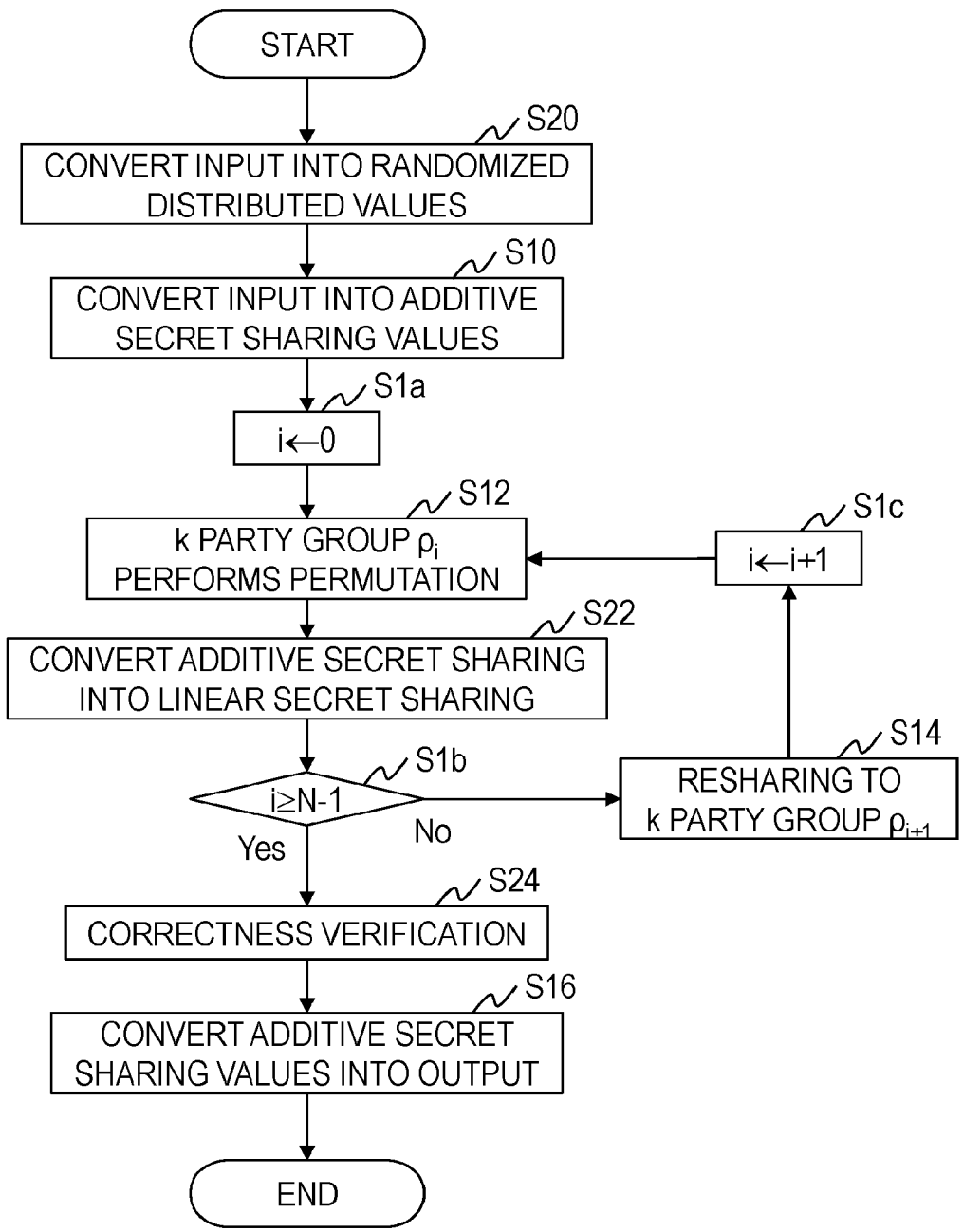
FIG. 7 illustrates a processing flow of a secret calculation method according to the fourth embodiment.

Referring to FIG. 7, one example of a processing flow of a secret calculation method which is executed by the secret calculation system according to the fourth embodiment is described in accordance with an order of a procedure which is actually performed.

In step S20, the randomization units 20 provided to the k pieces of random permutation devices $1_{p0}$ convert the (k,n)-secret sharing values $[a]_{pi}$ which are stored into randomized distributed values. In the case where the disclosed values a are stored in the storage unit 18, the disclosed values a are converted into the (k,n)-secret sharing values $[a]_{pi}$ so as to be converted into randomized distributed values. The randomized distributed value is the set $([a]_{pi},[ar]_{pi})$ composed of the distributed value $[a]_{pi}$ of the value a∈R and the distributed value $[ar]_{pi}$ of the integrated value ar of the value a∈R and the random number r∈A. Here, R represents a ring and A represents an associative algebra on the ring R. The associative algebra is a joined ring and has a structure in a linear space on a certain field compatible with the ring. The associative algebra can be described such that a value dealt in a vector space may be a ring instead of a field. The 0th component $([a]_{pi})$ of the randomized distributed value is also referred to as the R component and the first component $([ar]_{pi})$ is also referred to as the A component.

A random number used in generation of a randomized distributed value is generated such that a distributed value for one secret sharing is converted into a distributed value for the other secret sharing so as to obtain an identical value of the random number in the case where a plurality of types of secret sharing on one ring are used. In this format conversion as well, tampering detection should be possible or tampering should be impossible. For example, a method which prohibits tampering conversion from replicated secret sharing into linear secret sharing is described in Reference Literature 2 above.

In step S22, the unit conversion units 22 provided to the k pieces of random permutation devices $1_{pi}$ convert the additive secret sharing values «a»$^{pi}$ which are permutated by the unit permutation unit 12 into randomized distributed values by (k,n)-secret sharing so as to be accumulated in the storage units 18. The accumulated randomized distributed values are used for calculation for a checksum by the correctness verification unit 24 which will be described later. Accumulation of randomized distributed values does not necessarily have to be performed after all unit permutation but may be performed in part of unit permutation.

In step S24, the correctness verification unit 24 executes synchronous processing (SYNC) in which an action of waiting is performed until all secret calculations for all secret sharing are ended. When the end of all secret calculations for all secret sharing is detected, the checksums $C_0, \ldots, C_{J-1}$ are verified by using the distributed values $[r_0], \ldots, [r_{J-1}]$ of the random numbers $r_0, \ldots, r_{J-1}$ which are used in the randomization unit 20 so as to verify correctness of (k,n)-secret sharing values or disclosed values which are obtained as a result of secret random permutation. In the case where it is determined that there is no tampering as a result of the verification of the checksums $C_0, \ldots, C_{J-1}$, the processing goes to step S16. In the case where it is determined that there is tampering, information representing the presence of tampering (for example, "⊥" or the like) is outputted.

In the verification of a checksum, the distributed value $[\varphi_j]$ obtained by multiplying a sum of the R components of randomized distributed values included in the checksum $C_j$ by the distributed value $[r_j]$ and the distributed value $[\psi_j]$ which is a sum of the A components of randomized distributed values included in the checksum $C_j$ are calculated and the distributed value $[\delta_j]=[\varphi_j]-[\psi_j]$ obtained by subtracting the distributed value $[\psi_j]$ from the distributed value $[\varphi_j]$ is restored. When all of the values $\delta_0, \ldots, \delta_{J-1}$ are 0, it is determined that there is no tampering in the whole secret random permutation. When any value $\delta_j$ is not 0, it is determined that tampering is performed in any operation in the secret random permutation.

In the case where there are pieces of secret sharing on one ring among J pieces of secret sharing, if correctness verification is performed collectively to the extent possible, the number of disclosed values is reduced and consequently confidentiality can be further enhanced. For example, in the case where the α-th (α=0, . . . , J−1) secret sharing and the β-th (β=0, . . . , J−1, α≠β) secret sharing are pieces of secret sharing on one ring, the correctness verification is performed as follows. First, the distributed value $[\varphi_\alpha]$ which is calculated from the checksum $C_\alpha$ as described above and the distributed value $[\psi_\alpha]$ which is calculated from the checksum $C_\alpha$ as described above are respectively converted into the β-th secret sharing. Then, the distributed value $[\delta]([\varphi_\alpha]+[\varphi_\beta])-([\psi_\alpha]+[\psi_\beta])$ which is obtained by subtracting the distributed value $[\psi_\alpha+\psi_\beta]$ which is obtained by adding the converted distributed value $[\psi_\alpha]$ and the distributed value $[\psi_\beta]$ which is calculated from the β-th checksum $C_\beta$ in a similar manner from the distributed value $[\varphi_\alpha+\varphi_\beta]$ which is obtained by adding the converted distributed value $[\varphi_\alpha]$ and the distributed value $[\varphi_\beta]$ which is calculated from the checksum $C_\beta$ in a similar manner is restored. When the restored value δ is 0, it is determined that there is no tampering. When the restored value δ is other than 0, it is determined that there is tampering. Thus, all combinations of pieces of secret sharing on one ring are verified so as to verify that there is no tampering in the whole secret random permutation. The example in which two pieces of secret sharing are secret sharing on one ring is described in the present embodiment. However, correctness verification can be performed by a similar method even in the case where three or more pieces of secret sharing are secret sharing on one ring.

In step S16, the post-facto conversion unit 16 converts additive secret sharing values into (k,n)-secret sharing values or disclosed values. In the above-described embodiment, such configuration is employed that the additive secret sharing values «a»$^{\rho^{N-1}}$ after execution of last permutation processing are transmitted to the random permutation device $1_p$ and the random permutation device $1_p$ obtains disclosed values a by the restoration method of additive secret sharing values in the case where an output is a disclosed value. In the present embodiment, in order to detect tampering in disclosure, such configuration is employed that additive secret sharing values are once converted into (k,n)-secret sharing values and then disclosed values a are obtained by the restoration method of (k,n)-secret sharing.

When disclosed values are obtained from (k,n)-secret sharing values, a disclosure method in which tampering can be detected is required. As the disclosure method in which tampering can be detected, there is the method described in the appendix of Reference Literature 4 above. Alternatively, tampering can be detected by performing disclosure as follows.

The random permutation device $1_p$ receives (k,n)-secret sharing values which are obtained by converting a format of the additive secret sharing values «a»$^{\rho^{N-1}}$ from arbitrary k−1 pieces of random permutation devices. Further, checksums such as hash values of the (k,n)-secret sharing values which are obtained by converting the format of the additive secret sharing values «a»$^{\rho^{N-1}}$ are received from n−k pieces of random permutation devices which are the rest of random permutation devices. The checksum does not have to be a hash value but a safer and more information-theoretical checksum can be used. The information-theoretical checksum is a combination of a random number r and $a_i r^{i+1}$ when a calculation object of the checksum is $a_i$, for example. The random permutation device $1_p$ recovers n−k pieces of (k,n)-secret sharing values from k pieces of (k,n)-secret sharing values to which a (k,n)-secret sharing value possessed by the random permutation device $1_p$ is added and calculates checksums respectively from the (k,n)-secret sharing values which are recovered. Here, the recovery is a method in which n−k pieces of distributed values which are unusable are reconstructed without losing secrecy from k pieces of distributed values which are usable when part of distributed values are lost.

Subsequently, the random permutation device $1_p$ confirms whether or not the checksums of the (k,n)-secret sharing values which are received from the n−k pieces of random permutation devices and the checksums of the recovered (k,n)-secret sharing values are accorded with each other. In the case where all of the checksums are accorded with each other, it is determined that there is not tampering and (k,n)-secret sharing values or disclosed values are outputted. In the case where any of the checksums are different from each other, it is determined that there is tampering and information representing the presence of tampering (for example, "⊥" or the like) is outputted.

The configuration as that of the present embodiment enables tampering detection and enhances security in the secret random permutation of the present invention.

[Combination of Configuration Examples]

The present invention can employ various configurations by combining four independent standpoints other than the above-described embodiments.

The first standpoint is a form of an input and an output. From this standpoint, four configuration methods are conceivable. The first configuration is a case where an input is a linear secret sharing value and an output is a linear secret sharing value. The second configuration is a case where an input is a linear secret sharing value and an output is a replicated secret sharing value or a case where an input is a replicated secret sharing value and an output is a linear secret sharing value on the other way. The third configuration is a case where an input is a disclosed value and an output is a secret sharing value. The fourth configuration is a case where an input is a linear secret sharing value and an output is a disclosed value.

The second standpoint is a standpoint of the random number generation method. In this standpoint, two configuration methods are conceivable. The first configuration is the case where a random number is a pseudo random number which is generated from a seed which is preliminarily shared. The second configuration is the case where a random number is shared in execution of a protocol.

The third standpoint is a standpoint of types of random permutation. In this standpoint, two configuration methods are conceivable. The first configuration is the case where permutation data is arbitrary, that is, the case where shuffling is desired to be performed in a totally random manner. The second configuration is the case where permutation data is limited by rotation, that is, the case where permutation data is expressed by certain $r \in N_m$, $\pi(i)=i+r \mod m$ is satisfied, and an absolute position is desired to be concealed while a relative alignment order does not have to be concealed.

The fourth standpoint is a standpoint of a specific example of repetition permutation limiting k and n. The first configuration is the case of k=2 and n=3. The second configuration is the case of k=3 and n=5. In this standpoint, six specific examples, in total, which are obtained by adding the standpoint of an input and an output to each configuration are conceivable.

Figure 8:
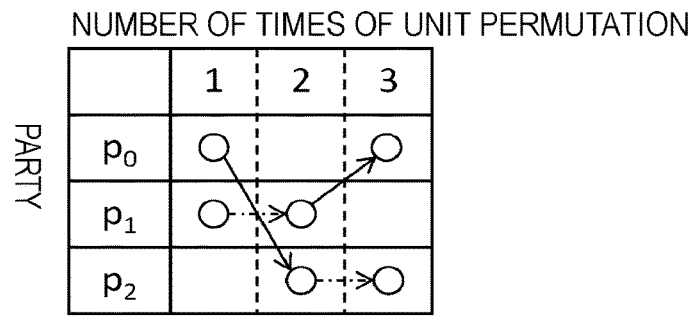
FIG. 8 illustrates a specific example of k=2 and n=3 in the first embodiment.

The first specific example is the case where both of an input and an output are secret sharing values in the configuration of k=2 and n=3. Referring to FIG. 8, repetition permutation of this specific example is described. In FIG. 8, the vertical axis represents a party and the horizontal axis represents the number of times of unit permutation. A circle represents a party which performs processing in unit permutation. A solid arrow represents a direction of a party to which a secret sharing value is transmitted in the resharing. A dotted arrow represents that the same party continuously holds a secret sharing value in the resharing. In the example of FIG. 8, the order $P=(\rho_0, \rho_1, \rho_2)$ of the k party group is set as $\rho_0=(p_0,p_1)$, $\rho_1=(p_1,p_2)$, and $\rho_2=(p_0,p_2)$. The parties $p_0$ and $p_1$ perform processing in the first unit permutation and a secret sharing value is transmitted from the party $p_0$ to the party $p_2$ in the first resharing. The parties $p_1$ and $p_2$ perform processing in the second unit permutation and a secret sharing value is transmitted from the party $p_1$ to the party $p_0$ in the second resharing. The parties $p_0$ and $p_2$ perform processing in the third unit permutation and repetition permutation is completed.

Figure 9:
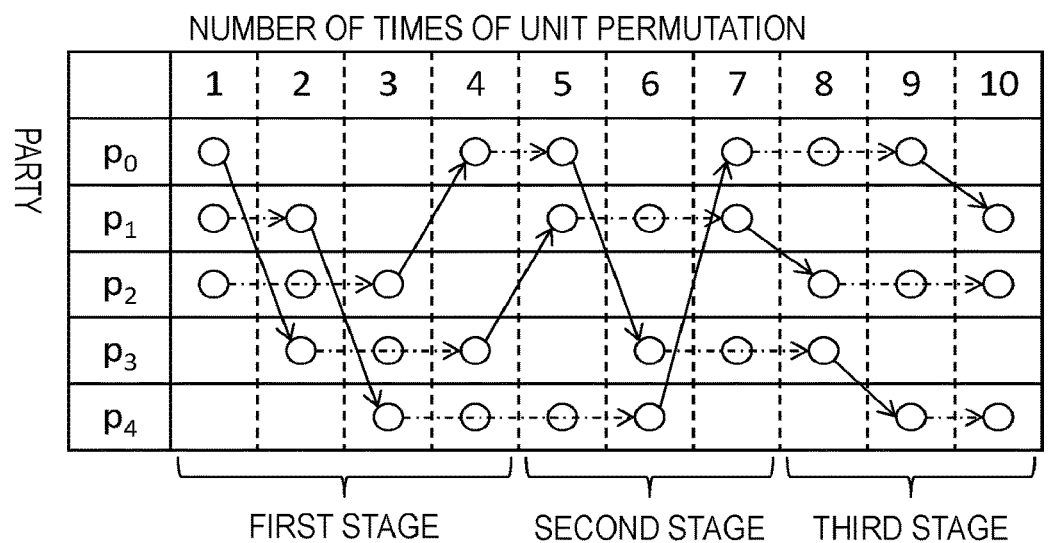
FIG. 9 illustrates a specific example of k=3 and n=5 in the first embodiment.

The second specific example is the case where both of an input and an output are secret sharing values in the configuration of k=3 and n=5. Referring to FIG. 9, repetition permutation of this specific example is described. Notation of the drawing is similar to that of FIG. 8. In the example of FIG. 9, the order $P=(\rho_0, \ldots, \rho_9)$ of the k party group is set as $\rho_0=(p_0,p_1,p_2)$, $\rho_1=(p_1,p_2,p_3)$, $\rho_2=(p_2,p_3,p_4)$, $\rho_3=(p_0,p_3,p_4)$, $\rho_4=(p_0,p_1,p_4)$, $\rho_5=(p_1,p_3,p_4)$, $\rho_6=(p_0,p_1,p_3)$, $\rho_7=(p_0,p_2,p_3)$, $\rho_8=(p_0,p_2,p_4)$, and $\rho_9=(p_1,p_2,p_4)$. The parties $p_0$, $p_1$, and $p_2$ perform processing in the first unit permutation and a secret sharing value is transmitted from the party $p_0$ to the party $p_3$ in the first resharing. The parties $p_1$, $p_2$, and $p_3$ perform processing in the second unit permutation and a secret sharing value is transmitted from the party $p_1$ to the party $p_4$ in the second resharing. The parties $p_2$, $p_3$, and $p_4$ perform processing in the third unit permutation and a secret sharing value is transmitted from the party $p_2$ to the party $p_0$ in the third resharing. The parties $p_0$, $p_3$, and $p_4$ perform processing in the fourth unit permutation and a secret sharing value is transmitted from the party $p_3$ to the party $p_1$ in the fourth resharing. Here, the secret sharing value which is transmitted from the party $p_3$ to the party $p_1$ is the secret sharing value which is transmitted from the party $p_0$ to the party $p_3$ in the first resharing, so that reception waiting of the party $p_1$ occurs before the fifth resharing. Accordingly, the resharing up to the fourth resharing is the first stage of communication. After that, permutation and resharing are repeated in a similar manner and thus, the repetition permutation is completed with three communication stages in this specific example.

The third specific example is the case where an input is a disclosed value and an output is a secret sharing value in the configuration of k=2 and n=3. Referring to FIG. 10, repetition permutation of this specific example is described. Notation of the drawing is similar to that of FIG. 8. In the example of FIG. 10, the order $P=(\rho_0,\rho_1,\rho_2)$ of the k party group is set as $\rho_0=\rho_1=(p_0)$ and $\rho_2=(p_1,p_2)$. Only the party $p_0$ performs processing in the first and second unit permutation. The unit permutation may be simply repeated twice or permutation for two-time permutation may be collectively performed. A secret sharing value is transmitted from the party $p_0$ to the parties $p_1$ and $p_2$ in the second resharing. The parties $p_1$ and $p_2$ perform processing in the third unit permutation and the repetition permutation is completed.

The fourth specific example is the case where an input is a disclosed value and an output is a secret sharing value in the configuration of k=3 and n=5. Referring to FIG. 11, repetition permutation of this specific example is described. Notation of the drawing is similar to that of FIG. 8. In the example of FIG. 11, the order $P=(\rho_0, \ldots, \rho_9)$ of the k party group is set as $\rho_0=\rho_1=\rho_2=\rho_3=\rho_4=\rho_5=(p_0)$, $\rho_6=(p_2,p_3,p_4)$, $\rho_7=(p_1,p_3,p_4)$, $\rho_8=(p_1,p_2,p_4)$, and $\rho_9=(p_1,p_2,p_3)$. In the first to sixth unit permutation, only the party $p_0$ performs processing. The unit permutation may be simply repeated six times or permutation for six-time permutation may be collectively performed. A secret sharing value is transmitted from the party $p_0$ to the parties $p_2$, $p_3$ and $p_4$ in the sixth resharing. The parties $p_2$, $p_3$, and $p_4$ perform processing in the seventh unit permutation and a secret sharing value is transmitted from the party $p_2$ to the party $p_1$ in the seventh resharing. The parties $p_1$, $p_3$, and $p_4$ perform processing in the eighth unit permutation and a secret sharing value is transmitted from the party $p_3$ to the party $p_2$ in the eighth resharing. The parties $p_1$, $p_2$, and $p_4$ perform processing in the ninth unit permutation and a secret sharing value is transmitted from the party $p_4$ to the party $p_3$ in the ninth resharing. The parties $p_1$, $p_2$, and $p_3$ perform processing in the tenth unit permutation and the repetition permutation is completed. As illustrated in FIG. 9, the repetition permutation is completed with two communication stages in this specific example.

The fifth specific example is the case where an input is a secret sharing value and an output is a disclosed value in the configuration of k=2 and n=3. Referring to FIG. 12, repetition permutation of this specific example is described. Notation of the drawing is similar to that of FIG. 8. In the example of FIG. 12, the order $P=(\rho_0,\rho_1,\rho_2)$ of the k party group is set as $\rho_0=(p_1,p_2)$ and $\rho_1=\rho_2$ $(p_0)$. The parties $p_1$ and $p_2$ perform processing in the first unit permutation and secret sharing values are transmitted from the party $p_1$ and $p_2$ to the party $p_0$. The party $p_0$ restores a secret sharing value and performs the second and third unit permutation. The unit permutation may be simply repeated twice or permutation for two-time permutation may be collectively performed. Thus, the repetition permutation is completed.

The sixth specific example is the case where an input is a secret sharing value and an output is a disclosed value in the configuration of k=3 and n=5. Referring to FIG. 13, repetition permutation of this specific example is described. Notation of the drawing is similar to that of FIG. 8. In the example of FIG. 13, the order $P=(\rho_0, \ldots, \rho_9)$ of the k party group is set as $\rho_0=(p_2,p_3,p_4)$, $\rho_1=(p_1,p_3,p_4)$, $\rho_2=(p_1,p_2,p_4)$, $\rho_3=(p_1,p_2,p_3)$, and $\rho_4=\rho_5=\rho_6=\rho_7=\rho_8=\rho_9=(p_0)$. The parties $p_2$, $p_3$, and $p_4$ perform processing in the first unit permutation and a secret sharing value is transmitted from the party $p_2$ to the party $p_1$ in the first resharing. After that, permutation and resharing are repeated by the parties $p_1$, $p_2$, $p_3$, and $p_4$ and after $N(=_4C_3=4)$-th permutation is completed, secret sharing values are transmitted from the parties $p_1$, $p_2$, and $p_3$ to the party $p_0$. The party $p_0$ restores a secret sharing value and performs the fifth to tenth unit permutation. The unit permutation may be simply repeated six times or permutation for six-time permutation may be collectively performed. Thus, the repetition permutation is completed.

It is obvious that the present invention is not limited to the above-described embodiments and alterations can be made as appropriate within a scope of the idea of the present invention. Various types of processing which are described in the above embodiments may be executed in time series in accordance with the described order and may be executed in parallel or individually in accordance with the processing capacity of the device performing the processing or in accordance with the need.

[Program and Recording Medium]

When various types of processing functions in the devices described in the above embodiments are implemented on a computer, the contents of processing function to be contained in each device is written by a program. With this program executed on the computer, various types of processing functions in the above-described devices are executed on the computer.

This program in which the contents of processing are written can be recorded in a computer-readable recording medium. The computer-readable recording medium may be any medium such as a magnetic recording device, an optical disc, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program stored in a portable recording medium or transferred from a server computer once in a storage unit of the computer, for example. When the processing is performed, the computer reads out the program stored in the recording medium of the computer and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, what is called application service provider (ASP) type of services may be used to perform the processing described above, with which the program is not transferred from the server computer to the computer and the processing function is realized only with execution instructions and result acquisition. It should be noted that a program according to the present embodiment includes information provided for processing performed by electronic calculation equipment, which is equivalent to a program (such as data which is not a direct instruction to the computer but has a property specifying the processing performed by the computer).

In the present embodiment, the present device is configured with a predetermined program executed on a computer. However, the present device may be configured with at least part of these processing contents realized in a hardware manner.

What is claimed is:

1. A secret calculation method, implemented by a system that includes n permutation devices which each respectively receive in advance one of n pieces of a plain text a, wherein at least k pieces of the n pieces are required to restore the original plain text a, in which n and k are set as integers which are 2 or larger, n>k holds, $N = {}_nC_k$ holds, $\rho$ is set as a group of k pieces of random permutation devices which are selected from the n random permutation devices, $\rho_0, \ldots, \rho_{N-1}$ are set to satisfy $|\rho_i \backslash \rho_{i+1}| = 1$ with respect to $i = 0, \ldots, N-2$, $«a»^{\rho_i}$ is set as additive secret sharing values of the plain text a, the additive secret sharing values being possessed by an i-th random permutation device group $\rho_i$, $«a»^{\rho_i}_p$ is set as an additive secret sharing value possessed by a random permutation device p among the additive secret sharing values $«a»^{\rho_i}$, $\pi_{\rho_i}$ is set as sub shares of permutation data $\pi$, the sub shares corresponding to the i-th random permutation device group $\rho_i$, a random permutation device $p_0$ is set as a random permutation device which is included in the i-th random permutation device group $\rho_i$ and is not included in an i+1-th random permutation device group $\rho_{i+1}$, a random permutation device $p_k$ is set as a random permutation device which is not included in the i-th random permutation device group $\rho_i$ and is included in the i+1-th random permutation device group $\rho_{i+1}$, and random permutation devices $p_j$ (j=1, ..., k-1) are set as k-1 pieces of random permutation devices which are included in both of the i-th random permutation device group $\rho_i$ and the i+1-th random permutation device group $\rho_{i+1}$, the secret calculation method comprising:

a unit permutation step in which processing circuitry of the random permutation devices $p_0, \ldots, p_{k-1}$ perform permutation of the additive secret sharing values $«a»^{\rho_i}$ by the sub shares $\pi_{\rho_i}$; and a resharing step in which the processing circuitry of random permutation device $p_0$ generates additive secret sharing values $«a»^{\rho_{i+1}}_{p_k}$ by using random numbers $r_1, \ldots, r_{k-1}$ which are respectively shared with the random permutation devices $p_j$ so as to transmit the additive secret sharing values $«a»^{\rho_{i+1}}_{p_k}$ to the random permutation device $p_k$ and each of the random permutation devices $p_j$ generates additive secret sharing values $«a»^{\rho_{i+1}}_{p_j}$ by using the random numbers $r_j$, wherein $\rho_0, \ldots, \rho_{N-1}$ are set so that a difference between a maximum value and a minimum value of a number of communication stages of paths from k pieces of random permutation devices, which are included in a 0th random permutation device group $\rho_0$, to k pieces of random permutation devices, which are included in an N-1-th random permutation device group $\rho_{N-1}$, becomes smallest.

2. The secret calculation method according to claim 1, wherein in the resharing step, the processing circuitry of the random permutation device $p_0$ generates the additive secret sharing values $«a»^{\rho_{i+1}}_{p_k}$ with a following formula, $$\langle\langle a \rangle\rangle^{\rho_{i+1}}_{p_k} = \langle\langle a \rangle\rangle^{\rho_i}_{p_0} - \sum_{1 \leq i < k} r_i, \text{ and}$$

each of the random permutation devices $p_j$ generates the additive secret sharing values $«a»^{\rho_{i+1}}_{p_j}$ with a following formula:

$$\langle\langle a \rangle\rangle^{\rho_{i+1}}_{p_j} = \langle\langle a \rangle\rangle^{\rho_i}_{p_j} - r_j.$$

3. The secret calculation method according to claim 1, further comprising:

a preliminary conversion step in which secret sharing values [a] obtained by (k,n)-secret sharing of the plain text a are converted into additive secret sharing values $«a»^{\rho_0}$; and a post-facto conversion step in which additive secret sharing values $«a»^{\rho_{N-1}}$ are converted into the secret sharing values [a] to be outputted.

4. The secret calculation method according to claim 2, further comprising:

a unit conversion step in which the additive secret sharing values $«a»^{\rho_i}$ which are permutated in the unit permutation step are converted into secret sharing values [a] based on (k,n)-secret sharing so as to be accumulated in a storage unit.

5. The secret calculation method according to claim 1, in which $N = {}_{n-1}C_k$ holds and $\rho$ is set as a group of k pieces of random permutation devices which are selected from n pieces of random permutation devices while excluding a predetermined random permutation device q, further comprising:

a preliminary conversion step in which the plain text a is converted into additive secret sharing values $«a»^{\rho_0}$; and a post-facto conversion step in which additive secret sharing values $«a»^{\rho_{N-1}}$ are converted into the secret sharing values [a] based on (k,n)-secret sharing to be outputted, wherein in the unit permutation step, the random permutation device q performs permutation of the plain text a with the sub shares $\pi_{\rho_i}$ in a case of $i \leq {}_nC_{k-n-1}C_k$, and the random permutation devices $p_1, \ldots, p_{k-1}$ perform permutation of the additive secret sharing values $«a»^{\rho_i}$ with the sub shares $\pi_{\rho_i}$ in a case of $i > {}_nC_{k-n-1}C_k$.

6. The secret calculation method according to claim 3, further comprising:

a unit conversion step in which the additive secret sharing values $«a»^{\rho_i}$ which are permutated in the unit permutation step are converted into secret sharing values [a] based on (k,n)-secret sharing so as to be accumulated in a storage unit.

7. The secret calculation method according to claim 1, in which $N = {}_{n-1}C_k$ holds and $\rho$ is set as a group of k pieces of random permutation devices which are selected from n pieces of random permutation devices while excluding a predetermined random permutation device q, further comprising:

a preliminary conversion step in which the secret sharing values [a] based on (k,n)-secret sharing of the plain text a are converted into additive secret sharing values «a»$^{\rho 0}$; and a post-facto conversion step in which additive secret sharing values «a»$^{\rho N-1}$ are restored so as to output the plain text a, wherein in the unit permutation step, in a case of i≤$_{n-1}C_k$ the random permutation devices $p_1, \ldots, p_{k-1}$ perform permutation of the additive secret sharing values «a»$^{\rho i}$ with the sub shares $\pi_{\rho i}$, and in a case of i>$_{n-1}C_k$ the random permutation device q performs permutation of the plain text a with the sub shares $\pi_{\rho i}$.

8. The secret calculation method according to claim 5, further comprising:

a unit conversion step in which the additive secret sharing values «a»$^{\rho i}$ which are permutated in the unit permutation step are converted into secret sharing values [a] based on (k,n)-secret sharing so as to be accumulated in a storage unit.

9. The secret calculation method according to claim 1, further comprising:

a unit conversion step in which the additive secret sharing values «a»$^{\rho i}$ which are permutated in the unit permutation step are converted into secret sharing values [a] based on (k,n)-secret sharing so as to be accumulated in a storage unit.

10. The secret calculation method according to claim 7, further comprising:

a unit conversion step in which the additive secret sharing values «a»$^{\rho i}$ which are permutated in the unit permutation step are converted into secret sharing values [a] based on (k,n)-secret sharing so as to be accumulated in a storage unit.

11. A secret calculation system comprising:

n random permutation devices when n is set as an integer which is 2 or larger, in which each of the random permutation devices respectively receive in advance one of n pieces of a plain text a, wherein at least k pieces of the n pieces are required to restore the original plain text a; wherein k is set as an integer which is 2 or larger, n>k holds, N=$_nC_k$ holds, ρ is set as a group of k random permutation devices which are selected from the n random permutation devices, $\rho_0, \ldots, \rho_{N-1}$ are set to satisfy |$\rho_i \backslash \rho_{i+1}$|=1 with respect to i=0, ..., N-2, «a»$^{\rho i}$ is set as additive secret sharing values of the plain text a, the additive secret sharing values being possessed by an i-th random permutation device group $\rho_1$, «a»$^{\rho i}_p$ is set as an additive secret sharing value possessed by a random permutation device p among the additive secret sharing values «a»$^{\rho i}$, $\pi_{\rho i}$ is set as sub shares of permutation data π, the sub shares corresponding to the i-th random permutation device group $\rho_i$, a random permutation device $p_0$ is set as a random permutation device which is included in the i-th random permutation device group $\rho_i$ and is not included in an i+1-th random permutation device group $\rho_{i+1}$, a random permutation device $p_k$ is set as a random permutation device which is not included in the i-th random permutation device group $\rho_i$ and is included in the i+1-th random permutation device group $\rho_{i+1}$, random permutation devices $p_j$ (j=1, ..., k−1) are set as k−1 pieces of random permutation devices which are included in both of the i-th random permutation device group $\rho_i$ and the i+1-th random permutation device group $\rho_{i+1}$, and the random permutation devices include processing circuitry configured to perform permutation of the additive secret sharing values «a»$^{\rho i}$ with the sub shares $\pi_{\rho i}$, and generate additive secret sharing values «a»$^{\rho i+1}_{pk}$ by using random numbers $r_1, \ldots, r_{k-1}$ which are shared with each of the random permutation devices $p_j$ so as to transmit the additive secret sharing values «a»$^{\rho i+1}_{pk}$ to the random permutation device $p_k$ when a corresponding random permutation device is the random permutation device $p_0$ and generate additive secret sharing values «a»$^{\rho i+1}_{pj}$ by using random numbers $r_j$ when the corresponding random permutation device is any one of the random permutation devices $p_j$, wherein $\rho_0, \ldots, \rho_{N-1}$ are set so that a difference between a maximum value and a minimum value of a number of communication stages of paths from k pieces of random permutation devices, which are included in a 0th random permutation device group $\rho_0$, to k pieces of random permutation devices, which are included in an N−1-th random permutation device group $\rho_{N-1}$, becomes smallest.

12. A random permutation device configured to be part of a system that includes n permutation devices which each respectively receive in advance one of n pieces of a plain text a, wherein at least k pieces of the n pieces are required to restore the original plain text a, in which n and k are set as integers which are 2 or larger, n>k holds, N=$_nC_k$ holds, ρ is set as a group of k pieces of random permutation devices which are selected from the n random permutation devices, $\rho_0, \ldots, \rho_{N-1}$ are set to satisfy |$\rho_i \backslash \rho_{i+1}$|=1 with respect to i=0, ..., N−2, «a»$^{\rho i}$ is set as additive secret sharing values of the plain text a, the additive secret sharing values being possessed by an i-th random permutation device group $\rho_i$, «a»$^{\rho i}_p$ is set as an additive secret sharing value possessed by a random permutation device p among the additive secret sharing values «a»$^{\rho i}$, $\pi_{\rho i}$ is set as sub shares of permutation data π, the sub shares corresponding to the i-th random permutation device group $\rho_i$, a random permutation device $p_0$ is set as a random permutation device which is included in the i-th random permutation device group $\rho_1$ and is not included in an i+1-th random permutation device group $\rho_{i+1}$, a random permutation device $p_k$ is set as a random permutation device which is not included in the i-th random permutation device group $\rho_i$ and is included in the i+1-th random permutation device group $\rho_{i+1}$, and random permutation devices $p_j$ (j=1, ..., k−1) are set as k−1 pieces of random permutation devices which are included in both of the i-th random permutation device group $\rho_i$ and the i+1-th random permutation device group $\rho_{i+1}$, the random permutation device comprising:

processing circuitry configured to perform permutation of the additive secret sharing values «a»$^{\rho i}$ with the sub shares $\pi_{\rho i}$; and generate additive secret sharing values «a»$^{\rho i+1}_{pk}$ by using random numbers $r_1, \ldots, r_{k-1}$ which are shared with each of the random permutation devices $p_j$ so as to transmit the additive secret sharing values «a»$^{\rho i+1}_{pk}$ to the random permutation device $p_k$ when a corresponding random permutation device is the random permutation device $p_0$ and generate additive secret sharing values «a»$^{\rho i+1}_{pj}$ by using random numbers $r_j$ when the corresponding random permutation device is any one of the random permutation devices $p_j$, wherein $\rho_0, \ldots, \rho_{N-1}$ are set so that a difference between a maximum value and a minimum value of a number of communication stages of paths from k pieces of random permutation devices, which are included in a 0th random permutation device group $\rho_0$, to k pieces of random permutation devices, which are included in an N–1-th random permutation device group $\rho_{N-1}$, becomes smallest.

13. A non-transitory computer readable medium including computer executable instructions that make a computer function as a random permutation device configured to be part of a system that includes n permutation devices which each respectively receive in advance one of n pieces of a plain text a, wherein at least k pieces of the n pieces are required to restore the original plain text a, in which n and k are set as integers which are 2 or larger, n>k holds, $N = {}_nC_k$ holds, $\rho$ is set as a group of k pieces of random permutation devices which are selected from the n random permutation devices, $\rho_0, \ldots, \rho_{N-1}$ are set to satisfy $|\rho_i \backslash \rho_{i+1}| = 1$ with respect to i=0, ..., N–2, «a»$^{\rho^i}$ is set as additive secret sharing values of the plain text a, the additive secret sharing values being possessed by an i-th random permutation device group $\rho_i$, «a»$^{\rho^i}_p$ is set as an additive secret sharing value possessed by a random permutation device p among the additive secret sharing values «a»$^{\rho^i}$, $\pi_{\rho^i}$ is set as sub shares of permutation data π, the sub shares corresponding to the i-th random permutation device group $\rho_i$, a random permutation device $p_0$ is set as a random permutation device which is included in the i-th random permutation device group $\rho_i$ and is not included in an i+1-th random permutation device group $\rho_{i+1}$, a random permutation device $p_k$ is set as a random permutation device which is not included in the i-th random permutation device group $\rho_i$ and is included in the i+1-th random permutation device group $\rho_{i+1}$, and random permutation devices $p_j$ (j=1, ..., k–1) are set as k–1 pieces of random permutation devices which are included in both of the i-th random permutation device group $\rho_i$ and the i+1-th random permutation device group $\rho_{i+1}$, the random permutation device comprising:

processing circuitry configured to perform permutation of the additive secret sharing values «a»$^{\rho^i}$ with the sub shares $\pi_{\rho^i}$; and generate additive secret sharing values «a»$^{\rho^{i+1}}_{pk}$ by using random numbers $r_1, \ldots, r_{k-1}$ which are shared with each of the random permutation devices $p_j$ so as to transmit the additive secret sharing values «a»$^{\rho^{i+1}}_{pk}$ to the random permutation device $p_k$ when a corresponding random permutation device is the random permutation device $p_0$ and generate additive secret sharing values «a»$^{\rho^{i+1}}_{pj}$ by using random numbers $r_j$ when the corresponding random permutation device is any one of the random permutation devices $p_j$, wherein $\rho_0, \ldots, \rho_{N-1}$ are set so that a difference between a maximum value and a minimum value of a number of communication stages of paths from k pieces of random permutation devices, which are included in a 0th random permutation device group $\rho_0$, to k pieces of random permutation devices, which are included in an N–1-th random permutation device group $\rho_{N-1}$, becomes smallest.

* * * * *